May 12, 1931.  N. B. CHACE  1,804,673
RADIAL DRILL
Filed Oct. 14, 1925  2 Sheets-Sheet 1

Inventor
Norman B. Chace,
By Murray and Gugelter
Attorneys

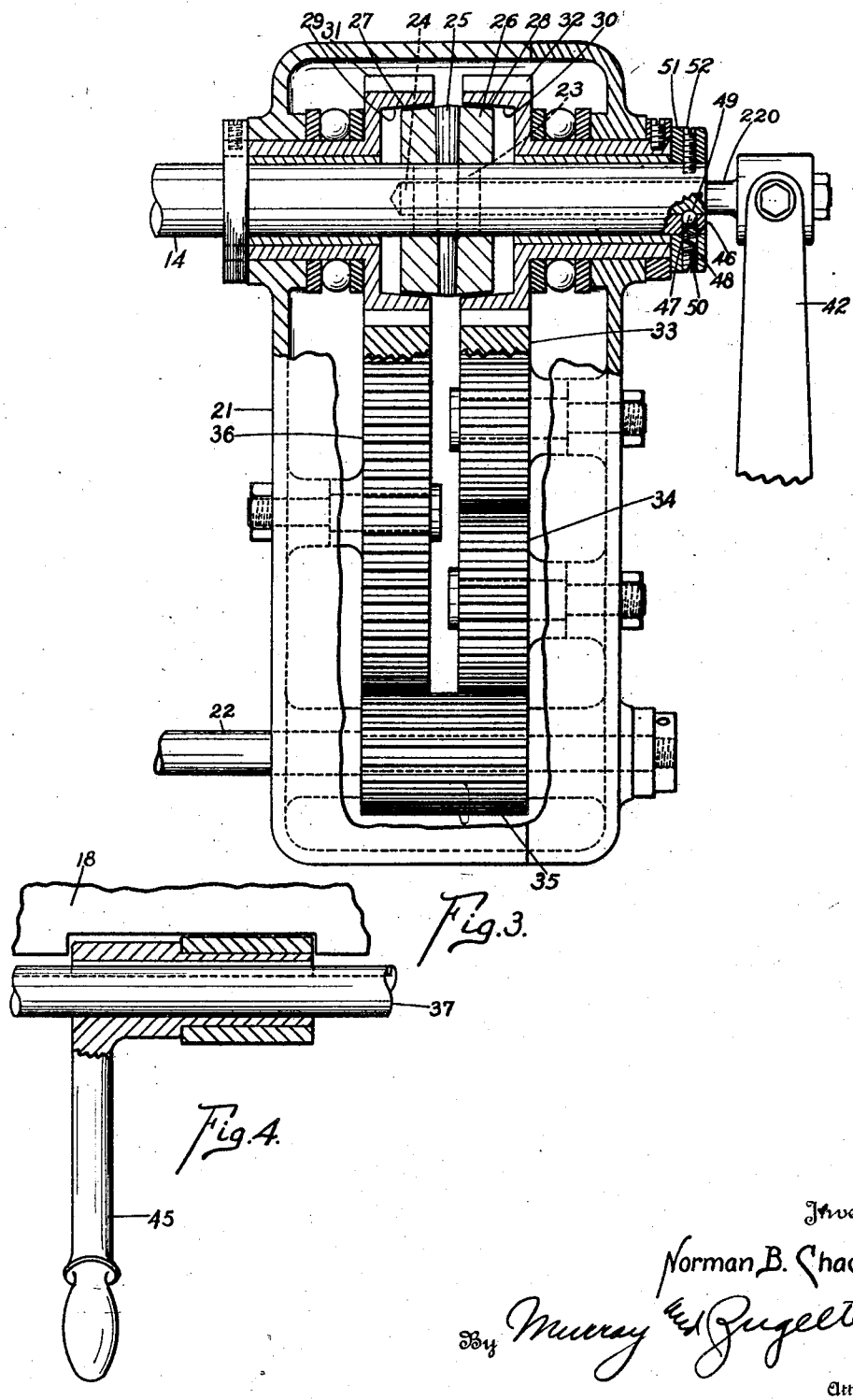

Patented May 12, 1931

1,804,673

UNITED STATES PATENT OFFICE

NORMAN B. CHACE, OF CINCINNATI, OHIO

RADIAL DRILL

Application filed October 14, 1925. Serial No. 62,486.

An object of my invention is to provide power driven means for feeding a carriage of radial drills and the like longitudinally of the arm of the drill.

Another object of my invention is to provide a device for the purpose stated wherein the operator will at all times have ready access to the means controlling movement of the spindle carriage.

Another object of my invention is to provide a device for the purpose stated wherein the operator may selectively employ manual or power actuated means for moving the spindle carriage.

Another object of my invention is to provide a simple and efficient device for the purposes stated.

These and other objects are attained by the means described herein and disclosed in the accompanying drawings, in which Figure 1 is a view in elevation, showing a radial drill to which is applied a device embodying my invention.

Figure 3 is a fragmental sectional view showing the friction means and power transmission members forming details of my invention.

Figure 4 is a fragmental sectional view showing the mounting of a hand lever forming a detail of my invention.

Figure 1:
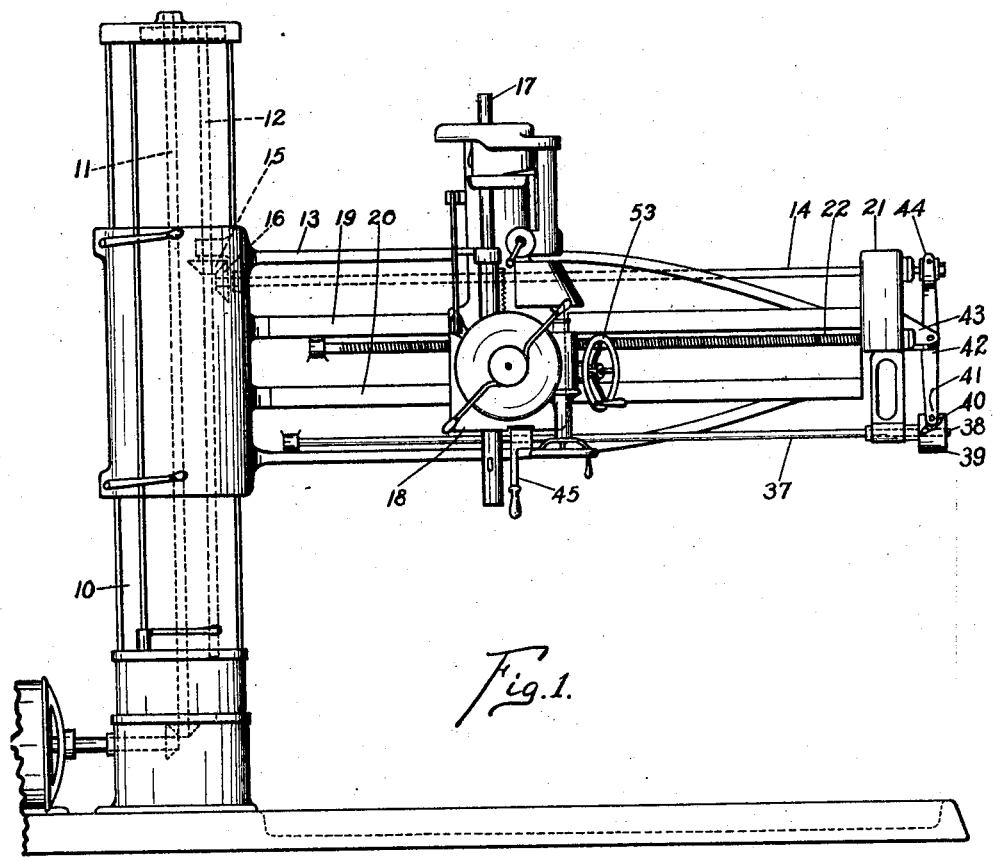

The column 10 may be of any suitable construction and is provided with the customary vertical drive shafts 11 and 12. Mounted upon the column is the customary arm 13, carrying a horizontal shaft 14, that is driven from the shaft 12 by suitable bevel gears 15 and 16. The horizontal shaft 14 is provided with suitable means whereby power and motion may be transmitted therefrom to the spindle 17, carried by the carriage 18. The carriage 18 is slidably mounted upon vertically spaced ways or rails 19 and 20.

Means are provided for moving the carriage 18 longitudinally of the rails 19 and 20, by power derived from the shaft 14. These means comprise friction members disposed within the housing 21 for driving a screw 22 carried by the arm and extending in substantial parallelism with the ways. The structure within the housing 21 is disclosed in Figure 3.

The shaft 14 is provided at the outer ends of the arm and said shaft with an axial bore in which bore is received a rod 220. The shaft 14 is provided with a radial elongated aperture 23, communicating with the axial bore 24, and a pin 25 extends through the opening 23, through the rod 220, and secures a friction pulley 26 to the rod 220 and the shaft 14 in such manner that the pulley must revolve with the shaft 14 and the rod 220. The pulley may be actuated longitudinally of the shaft 14 by means of rod 220. The friction pulley is provided with conical faces 27 and 28, adapted for selective engagement upon complementary internal conical faces 29 and 30 respectively formed on gears 31 and 32 respectively.

From the foregoing explanation it will be evident that the conical surfaces constitute a pair of friction clutches for selective transmission of power from shaft 14 to the gears 31 and 32. The gear 32 drives idler gears 33 and 34, carried by suitable stud shafts mounted on housing, the gear 34 engaging gear 35 mounted on the end of the screw shaft 22. The gear 31 engages idler gear 36 carried by a suitable stud shaft mounted on the housing and engaging the gear 35.

From the foregoing it will be evident that if one of the gears 31 or 32 is in frictional driving engagement with the cone clutch or friction member 26, the other of said gears will revolve freely about the shaft 14. To accomplish this free rotation of the loose gear 31 or 32, as the case may be, there are provided suitable bearings or bushings as disclosed in Figure 3.

Transmission of power from shaft 14 to screw shaft 22, is controlled from a rod 37, extending longitudinally of the arm 13. The shaft 37 is provided at its outer end 38 with a cam 39, provided with an elongated recess 40. The recess 40 is spirally disposed at the outer face of the cam 39, and receives a suitable roller or the like, carried by the end 41 of the lever 42 pivotally mounted intermediate its ends upon bracket 43, extending from the end of the arm 13. The end 44, of the lever 42, is provided with a suitable fork and bearing for revolubly receiving the rod 220, whereby to permit rotation of the rod 220, and to permit longitudinal reciprocation of the rod 220, by means of the lever 42.

Upon the rod 37, and associated with the carriage 18, there is provided a hand lever 45. Any suitable arrangement or structure may be provided for causing the hand lever 45 to move longitudinally of the rod 37, in accordance with the reciprocation of the carriage longitudinally of the rails 19 and 20. The hand lever 45 is splined to the rod 37. If desired, the hand lever need not move with the carriage 18—this is a matter of choice.

From the foregoing, it will be readily evident that manipulation of the hand lever 45 will serve to actuate the lever 42, through the agency of the cam 39, and the elongated slot 40 provided therein, whereby to engage and disengage the cone double clutch member 26. It will be evident that upon release of the lever 45, the tendency of the force directed through the double cone clutch member 26, would be to return the parts to their neutral or inoperative position. In order to preclude accidental movement of the parts from their inoperative positions, there is provided a radial aperture 46, in which is reciprocally received a ball 47. A spring 48, bearing upon the ball 47, yieldingly retains the ball in a pocket 49, provided in the rod 22, at such position that the pocket 49, registers with the aperture 46, when the parts are in their inoperative positions. A suitable plug 50, precludes escape of the spring 48. As shown herein, the spring 48 is partly received within a bore in the collar 51, and which bore registers with the radial aperture 46. The collar is locked against movement independent of the shaft 14 by a suitable set screw 52.

Figure 2:
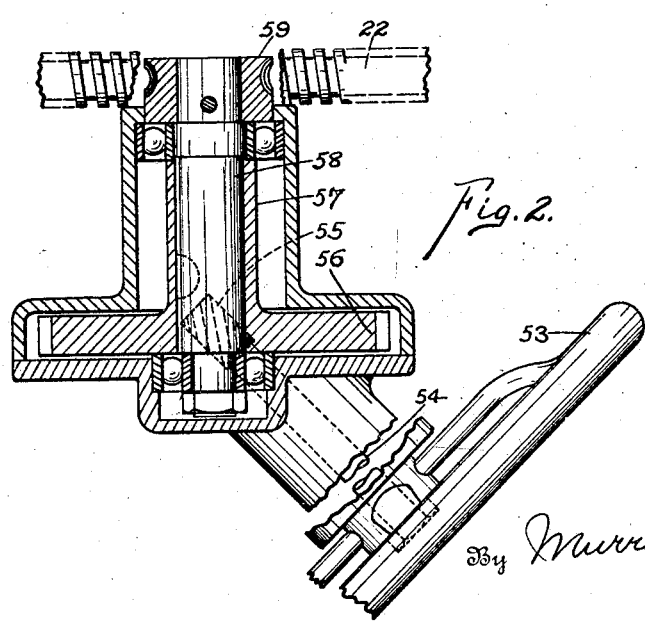
Figure 2 is a sectional plan view of the hand feed mechanism, parts being broken away, and constituting details of my invention.

Rotation of the screw shaft 22 is employed for effecting movement of the carriage 18, longitudinally of the rails 19 and 20. The carriage 18, has mounted upon it a hand wheel 53, (see Fig. 2). The hand wheel is mounted upon shaft 54, provided at its rear end with a skew or spiral gear 55, and engaging a helical gear 56. The gear 56 is formed at one end of the sleeve 57, receiving shaft 55, and to which shaft the sleeve 57 is keyed. A wormwheel or helical gear 59, is pinned to shaft 58, and engages the threads upon screw shaft 22. The relation of the elements just described are such that rotation of the screw shaft 22, when power actuated, from the shaft 14, will not revolve the hand wheel 53, wherefore it follows that the carriage must move longitudinally of the screw shaft 22. When the screw shaft 22 is stationary, rotation of the hand wheel serves to move the cartridge longitudinally of the screw shaft 22.

From the description given, the operation of the device is obvious.

What I claim is:

1. In a radial drill the combination of a vertical column, a horizontal arm mounted on the column, ways on the arm extending horizontally and longitudinally of the arm, a spindle carriage mounted slidably upon the ways, a revoluble spindle on the carriage, a power shaft extending longitudinally of the arm for transmitting motion to the spindle associated with the carriage, a screw shaft extending longitudinally of the arm, reversible means for transmitting rotary motion from the power shaft to the screw shaft, a rod extending longitudinally of the arm, a connection between the rod and the reversible means for controlling transmission of power from the power shaft to the screw shaft, a hand wheel on the carriage and a connection between the hand wheel and the screw shaft whereby rotatory motion of the screw shaft will move the carriage longitudinally of the ways, and whereby manual rotation of the hand wheel, while the screw shaft is stationary, likewise serves to actuate the carriage longitudinally of the ways.

2. In a radial drill the combination of a vertical column, a horizontal arm carried by the column and provided with horizontal ways extending longitudinally thereof, a revoluble power shaft, a revoluble screw shaft, and an oscillating rod mounted on the arm and extended longitudinally thereof, a spindle carriage reciprocally mounted on the ways, a spindle supported by the carriage, the spindle being adapted to be revolubly actuated from the power shaft, the arm having a free end, at which free end the power shaft, the screw shaft and the rod are provided with bearings, the power shaft being provided at the free end of the arm with an axial bore and with an elongated radial aperture, a rod extending into the bore in the power shaft, a clutch member extending about the power shaft, a pin extending through the elongated radial aperture in the power shaft, and connecting the clutch member with the rod whereby the clutch member, power shaft, and rod may revolve as a unit, and the clutch member be reciprocated longitudinally of the power shaft, the clutch member being provided with opposed conical faces, a pair of gears revolubly mounted on the power shaft, each of the gears provided with a conical friction surface complementary to the conical surfaces provided on the clutch member, whereby the clutch member may selectively drive the gears, gearing connecting the pair of gears with the screw shaft, a pivotally mounted lever revolubly receiving at its one end the rod extending from the power shaft, a cam carried by the rod extending longitudinally of the arm and engaging the lever for actuating the lever about its pivotal mounting and thereby reciprocating the rod associated with the power shaft, means for oscillating the cam and the rod associated therewith, a hand wheel revolubly mounted on the carriage and a worm wheel associated therewith and engaging the screw shaft.

3. The combination with a rail and a carriage reciprocally mounted on the rail, of a screw extending in parallelism with the rail, a worm gear mounted on the carriage engaging the screw, a gear associated with the worm gear for movement therewith, a skew gear mounted on the carriage and engaging the gear, means for revolubly actuating the skew gear, a power shaft, a clutch mechanism having a member for movement with the power shaft, and a complementary member for engagement with said first mentioned clutch member, gearing connecting the second mentioned clutch member and the screw, a lever slidably mounted on the arm and connected with the carriage for movement with the carriage and a connection between the lever and the clutch for engaging and dis-engaging the clutch member.

4. In a radial drill the combination of a column, a horizontal arm supported by the column, a power shaft and a screw shaft extending longitudinally of the arm, reversible means for driving the screw shaft from the power shaft, a carriage reciprocally mounted on the arm, a worm wheel on the carriage and engaging the screw for converting rotatory motion of the screw into movement of the carriage longitudinally of the arm, a manually operable means on the carriage, gearing associated with the worm wheel and the manually operable means for transmitting motion of the manually operable means to the worm wheel, said gearing being incapable of transmitting motion of the worm wheel to the manually operable means, and means for controlling transmission of power from the power shaft through the reversible power transmitting means to the screw shaft.

5. A machine having in combination a supporting rail, a power means, a screw shaft extending longitudinally of the rail, reversible means for driving the screw shaft from the power means, a carriage reciprocally mounted on the rail, a worm wheel on the carriage and engaging the screw for converting rotatory motion of the screw into movement of the carriage longitudinally of the rail, a manually operable means on the carriage, gearing associated with the worm wheel and the manually operable means for transmitting motion of the manually operable means to the worm wheel, said gearing being incapable of transmitting motion of the worm wheel to the manually operable means, and means for controlling transmission of power from the power means through the reversible power transmitting means to the screw shaft.

In testimony whereof, I have hereunto subscribed my name this 12th day of October, 1925.

NORMAN B. CHACE.